(12) United States Patent
Sasai (10) Patent No.: US 12,105,752 B2
(45) Date of Patent: Oct. 1, 2024

(54) AUDIO ANALYSIS METHOD, AUDIO ANALYSIS DEVICE AND NON-TRANSITORY COMPUTER-READABLE MEDIUM

(71) Applicant: Yamaha Corporation, Shizuoka (JP)

(72) Inventor: Dan Sasai, Shizuoka (JP)

(73) Assignee: YAMAHA CORPORATION, Shizuoka (JP)

(*) Notice: Subject to any disclaimer, the term of this patent is extended or adjusted under 35 U.S.C. 154(b) by 277 days.

(21) Appl. No.: 17/705,100

(22) Filed: Mar. 25, 2022

(65) Prior Publication Data

US 2022/0215051 A1 Jul. 7, 2022

Related U.S. Application Data

(63) Continuation of application No. PCT/JP2019/038110, filed on Sep. 27, 2019.

(51) Int. Cl.
*G06F 16/683* (2019.01)
*G06F 16/65* (2019.01)
*G06F 16/68* (2019.01)
*G10H 1/00* (2006.01)

(52) U.S. Cl.
CPC ............ *G06F 16/683* (2019.01); *G06F 16/65* (2019.01); *G06F 16/686* (2019.01); *G10H 1/0008* (2013.01)

(58) Field of Classification Search
CPC .... G06F 16/683; G06F 16/68; G06F 3/04842; G06F 17/00
USPC .......................................................... 700/94
See application file for complete search history.

(56) References Cited

U.S. PATENT DOCUMENTS

| | | | |
|---|---|---|---|
| 2008/0040362 A1* | 2/2008 | Aucouturier | G06F 16/68 |
| 2009/0043811 A1 | 2/2009 | Yamamoto et al. | |
| 2009/0056525 A1* | 3/2009 | Oppenheimber | G06F 16/683 84/609 |

(Continued)

FOREIGN PATENT DOCUMENTS

| | | | |
|---|---|---|---|
| JP | 2007-026425 A | 2/2007 | |
| JP | 2009-205247 A | 9/2009 | |

(Continued)

OTHER PUBLICATIONS

International Search Report in PCT/JP2019/038110, dated Dec. 10, 2019.

(Continued)

*Primary Examiner* — Alexander Krzystan
(74) *Attorney, Agent, or Firm* — Global IP Counselors, LLP (57) ABSTRACT

An audio analysis device comprises an electronic controller including at least one processor. The electronic controller is configured to execute a plurality of modules including a signal acquisition module configured to acquire an audio signal representing performance sounds of a musical piece, a signal analysis module configured to calculate, for each of a plurality of music categories, a feature value that includes a degree of certainty that the musical piece belongs to the music category, by analyzing the audio signal, and a music selection module configured to select one or more candidate musical pieces whose feature value is similar to the feature value calculated for the musical piece from among a plurality of candidate musical pieces.

11 Claims, 8 Drawing Sheets

(56) References Cited

U.S. PATENT DOCUMENTS

| | | | |
|---|---|---|---|
| 2009/0216622 A1 | 8/2009 | Hoashi et al. | |
| 2016/0321573 A1* | 11/2016 | Vangala | G06F 16/24575 |
| 2017/0124074 A1* | 5/2017 | Cama | G06F 16/438 |
| 2019/0005935 A1 | 1/2019 | Sasai | |
| 2019/0022351 A1* | 1/2019 | McCarthy | A61M 21/00 |
| 2020/0035225 A1* | 1/2020 | Ha | G06N 3/08 |
| 2022/0215051 A1* | 7/2022 | Sasai | G10H 1/0008 |

FOREIGN PATENT DOCUMENTS

| | | |
|---|---|---|
| JP | 2015-079110 A | 4/2015 |
| WO | 2017154928 A1 | 9/2017 |

OTHER PUBLICATIONS

Hareesh Bahuleyan, "Music Genre Classification using Machine Learning Techniques," arXiv:1804.01149 [cs.SD], Apr. 3, 2018.

\* cited by examiner

AUDIO ANALYSIS METHOD, AUDIO ANALYSIS DEVICE AND NON-TRANSITORY COMPUTER-READABLE MEDIUM

CROSS-REFERENCE TO RELATED APPLICATIONS

This application is a continuation application of International Application No. PCT/JP2019/038110, filed on Sep. 27, 2019. The entire disclosure of International Application No. PCT/JP2019/038110 is hereby incorporated herein by reference.

BACKGROUND

Field of the Invention

The present invention generally relates to a technology for analyzing an audio signal.

Background Information

Technologies for estimating the music genre to which a musical piece belongs through the analysis of an audio signal that represent performance sound of the musical piece have been proposed in the prior art. For example, Hareesh Bahuleyan, "Music Genre Classification using Machine Learning Techniques," arXiv:1804.01149 [cs.SD], 3 Apr. 2018 (Non-Patent Document 1) discloses a technology for estimating the music genre of a musical piece by analyzing an audio signal using machine learning techniques.

SUMMARY

However, actual musical pieces can contain musical features that are common to several music genres. Therefore, it can occur that a search for musical pieces that belong to the same music genre as a musical piece specified by a user can result in finding musical pieces with significantly different musical features. This statement focuses attention on music genre, but it can be assumed that similar problems occur for music categories that include classifications based on musical impressions such as "cheerful music," "depressing music," etc. In light of these circumstances, one object of the present disclosure is selection of appropriate musical pieces that are similar to a specific musical piece from the standpoint of a plurality of music categories.

In view of the state of the known technology, an audio analysis method according to one aspect of the present disclosure comprises acquiring an audio signal representing performance sounds of a musical piece, calculating, for each of a plurality of music categories, a feature value that includes a degree of certainty that the musical piece belongs to the music category, by analyzing the audio signal, and selecting one or more candidate musical pieces whose feature value is similar to the feature value calculated for the musical piece from among a plurality of candidate musical pieces.

In view of the state of the known technology, an audio analysis device according to another aspect of the present disclosure comprises an electronic controller including at least one processor. The electronic controller is configured to execute a plurality of modules including a signal acquisition module configured to acquire an audio signal representing performance sounds of a musical piece, a signal analysis module configured to calculate, for each of a plurality of music categories, a feature value that includes a degree of certainty that the musical piece belongs to the music category, by analyzing the audio signal, and a music selection module configured to select one or more candidate musical pieces whose feature value is similar to the feature value calculated for the musical piece from among a plurality of candidate musical pieces.

In view of the state of the known technology, a non-transitory computer-readable medium storing a program according to another aspect of the present disclosure causes a computer to function as a signal acquisition module configured to acquire an audio signal representing performance sounds of a musical piece, a signal analysis module configured to calculate, for each of a plurality of music categories, a feature value that includes a degree of certainty that the musical piece belongs to the music category, by analyzing the audio signal, and a music selection module configured to select one or more candidate musical pieces whose feature value is similar to the feature value calculated for the musical piece from among a plurality of candidate musical pieces.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A: First Embodiment

Figure 1:
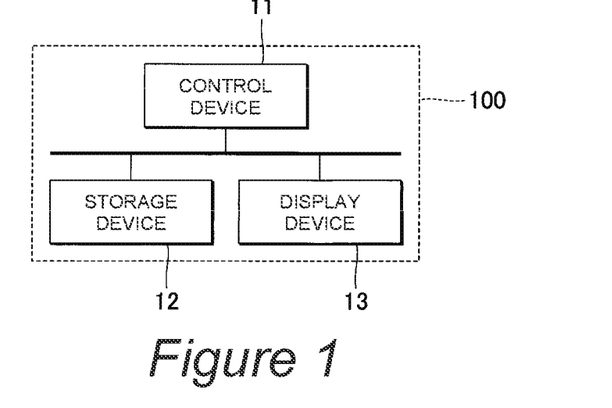
FIG. 1 is a block diagram showing the configuration of an audio analysis device according to a first embodiment.

FIG. 1 is a block diagram showing the configuration of an audio analysis device 100 according to a first embodiment of the present disclosure. The audio analysis device 100 is an information processing device that generate a feature value related to a music genre by analyzing an audio signal S that represents the performance sounds of a specific musical piece (hereinafter referred to as "target musical piece"). A music genre is a classification system that categorizes musical pieces into music classes (types). Typical examples of music genres are, among others, musical classifications such as rock, pops, jazz, dance, and blues.

The audio analysis device 100 is realized by means of a computer system comprising a control device 11, a storage device 12, and a display device or display 13. For example, the music analysis device 100 is realized by means of an information terminal such as a smartphone or a personal computer. The audio analysis device 100 can be realized as a single device or a plurality of separately configured devices (i.e., a system).

The control device 11 is an electronic controller including one or more processors that control each element of the audio analysis system 100. For example, the control device 11 is composed of one or more types of processors, such as a CPU (Central Processing Unit), an SPU (Sound Processing Unit), a DSP (Digital Signal Processor), an FPGA (Field Programmable Gate Array), an ASIC (Application Specific Integrated Circuit), etc. The display device 13 displays various images under the control of the control device 11. The display device 13 is a liquid-crystal display panel, for example. Here, the term "electronic controller" as used herein refers to hardware, and does not include a human.

The storage device 12 consists of one or more computer memories or memory units for storing a program that is executed by the control device 11 and various data that are used by the control device 11. The storage device 12 is composed of a known storage medium, such as a magnetic storage medium or a semiconductor storage medium. The storage device 12 can be composed of a combination of a plurality of types of storage media. A portable storage medium that can be attached to/detached from the audio analysis device 100, or an external storage medium (for example, online storage) with which the audio analysis device 100 can communicate, can also be used as the storage device 12. Thus, the storage device 12 can be any computer storage device or any computer readable medium with the sole exception of a transitory, propagating signal. For example, the storage device 12 can be a computer memory which can be nonvolatile memory and volatile memory.

The storage device 12 stores the audio signal S to be analyzed by the audio analysis device 100. The audio signal S is, for example, a time-domain signal that represents the mixed sounds of performance sounds of multiple performed parts that constitute the target musical piece. For example, the performance sounds of the target musical piece include the musical sounds produced by a musical instrument and/or the voice of a singer. The audio signal S is stored in the storage device 12 as a music file distributed from a music distribution device (not shown) to the audio analysis device 100.

Figure 2:
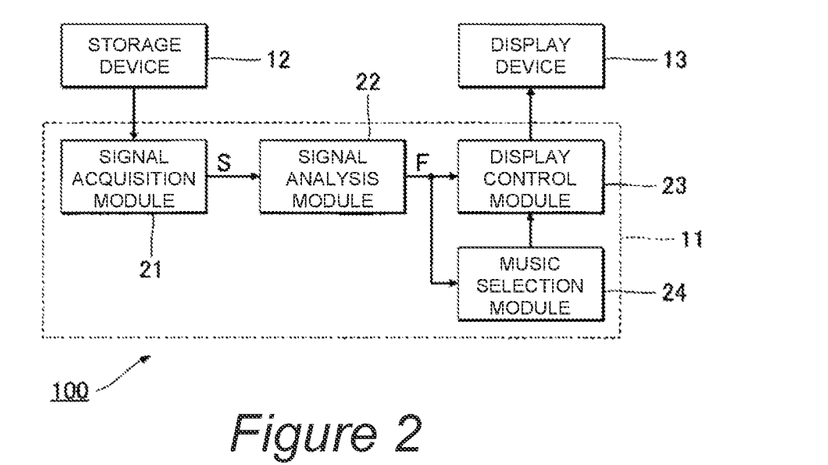
FIG. 2 is a block diagram showing the functional configuration of the audio analysis device.

FIG. 2 is a block diagram showing the functional configuration of the audio analysis device 100. The control device 11 realizes a plurality of functions (a signal acquisition module 21, a signal analysis module 22, a display control module 23, and a music selection module 24) for analyzing the audio signal S by executing programs that are stored in the storage device 12. In other words, the program is stored in a non-transitory computer-readable medium, such as the storage device 12, and causes the control device 11 to execute an audio analysis method or function as the signal acquisition module 21, the signal analysis module 22, the display control module 23, and the music selection module 24. Moreover, the functions of the control device 11 can be realized by a plurality of discrete devices, or some or all of the functions of the control device 11 can be realized by a dedicated electronic circuit. The signal acquisition module 21 acquires the audio signal S. Specifically, the signal acquisition module 21 sequentially reads each sample of the audio signal S from the storage device 12. The signal acquisition module 21 can acquire the audio signal S from an external device with which the audio analysis device 100 can communicate.

(Signal Analysis Module 22)

Figure 3:
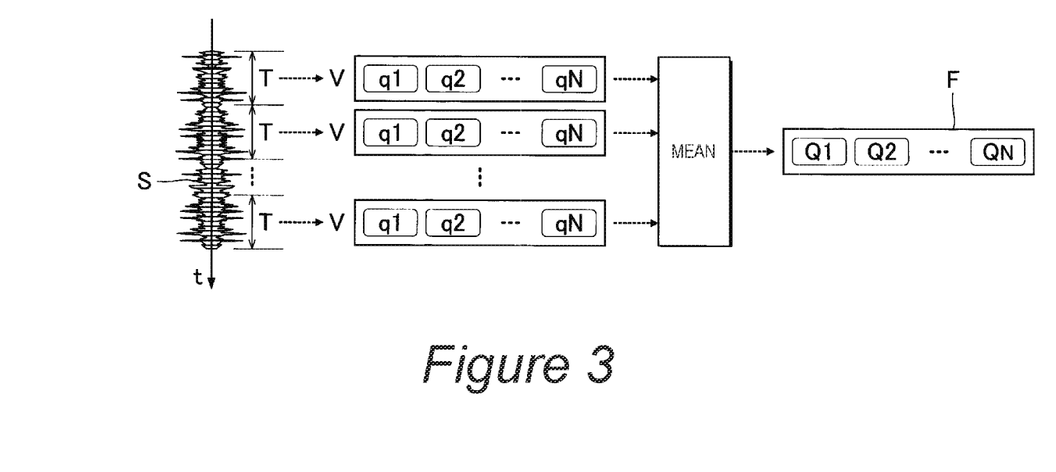
FIG. 3 is an explanatory diagram of a feature value.

The signal analysis module 22 analyzes the audio signal S in order to calculate a feature value F. FIG. 3 is an explanatory diagram of the feature value F. The feature value F is an N-dimensional vector (where N is a positive integer greater than or equal to 2) that includes N degrees of certainty Q1-QN corresponding to different music genres Gn. The degree of certainty Qn corresponding to the nth (n=1–N) music genre Gn is an index of the probability that the target musical piece represented by the audio signal S belongs to said music genre Gn. That is, for example, it can be determined that the greater the degree of certainty Qn of one feature value F, the higher the probability that the target musical piece belongs to the nth music genre Gn. As can be understood from the foregoing explanation, the feature value F is an index for evaluating the music genre Gn to which the target musical piece belongs.

Figure 4:
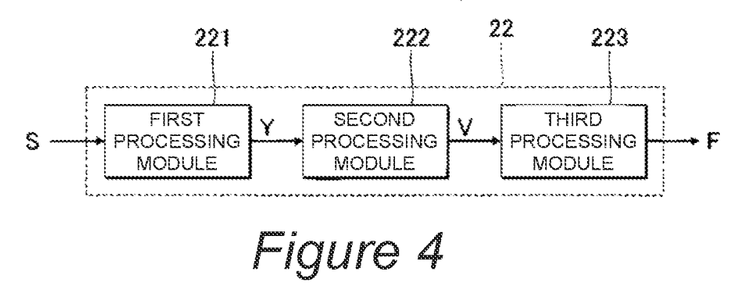
FIG. 4 is a block diagram showing the specific configuration of a signal analysis module.

FIG. 4 is a block diagram showing the specific configuration of the signal analysis module 22. The signal analysis module 22 includes or functions as a first processing module 221, a second processing module 222, and a third processing module 223.

Figure 5:
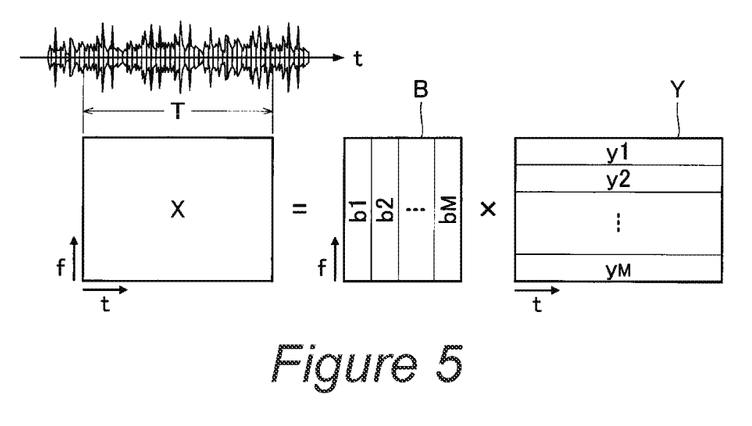
FIG. 5 is an explanatory diagram relating to the analysis of a variation pattern Y.

The first processing module 221 generates a variation pattern Y by analyzing the audio signal S. FIG. 5 is a diagram used to explain the analysis of the variation pattern Y. The symbol f in FIG. 5 represents frequency and the symbol t represents time. The first processing module 221 generates a variation pattern Y for each of a plurality of time intervals (hereinafter referred to as "unit time interval") T obtained by dividing the audio signal S on a time axis. The unit time interval T is an interval of time whose length corresponds to a prescribed number of bars (for example, 4 bars) of the target musical piece, for example.

The variation pattern Y is composed of M coefficient sequences y1-yM that correspond to different tones. The M types of tones are acoustic components that can appear in a large number of musical pieces. The coefficient sequence ym, corresponding to the mth (m=1 to M) tone of the M types of tones, is a non-negative numerical sequence representing temporal variations in the intensity (for example, amplitude or power) relating to the acoustic components of the tone in the audio signal S. For example, the tone differs for each type of sound source, such as a musical instrument, a singer, etc. In other words, the coefficient sequence ym is therefore the temporal variation in the intensity relating to the acoustic components of the mth sound source of the M types of sound sources.

The first processing module 221 generates the variation pattern Y from the audio signal S by means of non-negative matrix factorization (NMF) which uses a known basis matrix B. The basis matrix B is a non-negative matrix that includes M frequency characteristics b1-bM that correspond to different tones. The frequency characteristic bm that corresponds to the mth tone is a series of intensities for each frequency related to the acoustic component of the tone. Specifically, the frequency characteristic bm is an amplitude spectrum or a power spectrum, for example. The basis matrix B generated in advance by means of machine learning is stored in the storage device 12.

As can be understood from the foregoing explanation, the variation pattern Y is a non-negative coefficient matrix (activation matrix) that corresponds to the basis matrix B. That is, each coefficient sequence ym in the variation pattern Y is a time variation of a weighted value (activity times) with respect to the frequency characteristic bm in the basis matrix B. Each coefficient sequence ym is, in other words, a rhythm pattern related to the mth tone of the audio signal S. The trend of the rhythm pattern for each tone differs for each music genre Gn.

Figure 6:
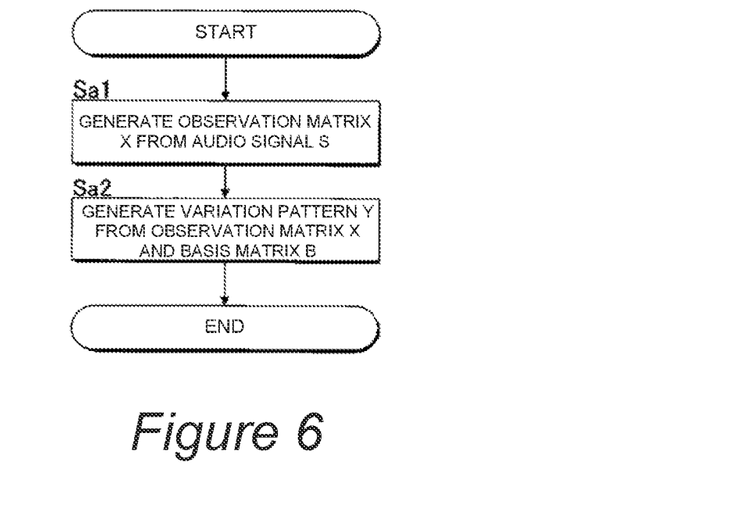
FIG. 6 is a flowchart showing the specific processing steps for generating a variation pattern.

FIG. 6 is a flowchart showing the specific processing steps of a process with which the first processing module 221 generates a variation pattern Y. The process of FIG. 6 is executed for each unit time interval T of the audio signal S.

The first processing module 221 generates an observation matrix X for each unit time interval T of the audio signal S (Sa1). As shown in FIG. 5, the observation matrix X is a non-negative matrix representing the time series of the frequency characteristics of the audio signal S. Specifically, a time series of the amplitude spectrum or the power spectrum (spectrogram) within the unit time interval T is generated as the observation matrix X.

The first processing module 221 calculates the variation pattern Y from the observation matrix X by means of non-negative matrix factorization using the basis matrix B stored in the storage device 12 (Sa2). Specifically, the first processing module 221 calculates the variation pattern Y such that a product BY of the basis matrix B and the variation pattern Y approximates (ideally, matches) the observation matrix X.

The second processing module 222 of FIG. 4 calculates a unit feature value V from the variation pattern Y. The unit feature value V is calculated for each unit time interval T. Specifically, as shown in FIG. 3, the second processing module 222 calculates, for each of a plurality of unit time intervals T, the unit feature value V from the variation pattern Y of the unit time interval T. The unit feature value V is an N-dimensional vector that includes N degrees of certainty q1-qN that correspond to different music genres Gn, in similar fashion to the above-mentioned feature value F. The degree of certainty qn corresponding to the nth music genre Gn is an index of the probability that the unit time interval T of the target musical piece represented by the audio signal S belongs to the music genre Gn.

The third processing module 223 finds the mean of the unit feature values V for a plurality of unit time intervals T in the target musical piece in order to calculate the feature value F. Specifically, the degree of certainty Qn of the nth music genre Gn of the feature value F is the mean value of the degree of certainty qn of the music genre Gn in the plurality of unit feature values V. Therefore, the feature value F which reflects the acoustic characteristics over a plurality of unit time intervals T in the target musical piece is calculated.

Figure 7:
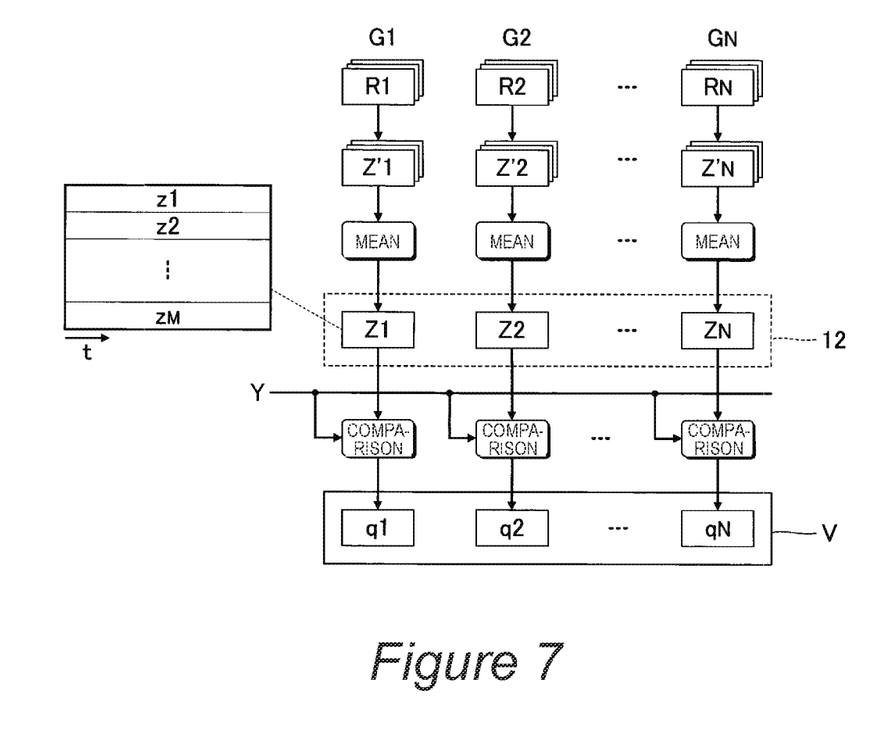
FIG. 7 is an explanatory diagram of the calculation of a unit feature value.

FIG. 7 is a diagram used to explain the calculation of the unit feature value V executed by the second processing module 222. N variation patterns Z1-ZN corresponding to different music genres Gn are stored in the storage device 12. Each variation pattern Zn is composed of M coefficient sequences z1-zM that correspond to different tones, in similar fashion to the above-mentioned variation pattern Y. Each variation pattern Zn is prepared by means of the following procedure, for example.

For each of the N music genres Gn, a plurality of reference signals Rn corresponding to different musical pieces of the music genre Gn are prepared. The variation pattern Zn of the music genre Gn is generated from the plurality of reference signals Rn prepared for each music genre Gn. The reference signal Rn is a time-domain signal representing the sounds of the accompaniment of the musical piece belonging to the nth music genre Gn. A variation pattern Z'n is generated from each reference signal Rn by means of the same procedure as is used for the signal analysis process of FIG. 6, and the mean of the variation patterns Z'n for a plurality of musical pieces belonging to one music genre Gn is found, thereby generating the variation pattern Zn of said music genre Gn. As can be understood from the foregoing explanation, the coefficient sequence zm of the variation pattern Zn is a rhythm pattern that is likely to occur in the mth tone in a musical piece belonging to the nth music genre Gn.

For each of the N music genres G1-GN, the second processing module 222 compares the variation pattern Zn of the music genre Gn with the variation pattern Y of the target musical piece, thereby calculating the degree of certainty qn of the unit feature value V. The degree of certainty qn is the correlation or distance between the variation pattern Zn and the variation pattern Y. In the following description, the correlation coefficient, which is an index of the correlation between the variation pattern Zn and the variation pattern Y, is represented as the degree of certainty qn. Accordingly, the higher the correlation between the variation pattern Zn and the variation pattern Y, the larger the numerical value of the degree of certainty qn. That is, the degree of certainty qn is an index of the probability that the target musical piece belongs to the music genre Gn. As can be understood from the foregoing explanation, the degree of certainty Qn of the feature value F is calculated by comparing the variation pattern Zn of the music genre Gn with the variation pattern Y of the target musical piece.

As can be understood from the foregoing explanation, the degree of certainty qn of the unit feature value V (as well as the degree of certainty Qn of the feature value F) can be calculated by comparing the variation pattern Zn representing trends in the rhythm patterns of the music genre Gn with the variation pattern Y representing trends in the rhythm pattern of the target musical piece. Therefore, feature values F that are similar to each other among a plurality of musical pieces tend to have a common music genre Gn.

(Display Control Module 23)

The display control module 23 causes the display device 13 to display the result of the analysis performed by the signal analysis module 22. Specifically, the display control module 23 causes the display device 13 to display a first analysis image 13*a* of FIG. 8 or 9, and a second analysis image 13*b* of FIG. 10.

Figure 8:
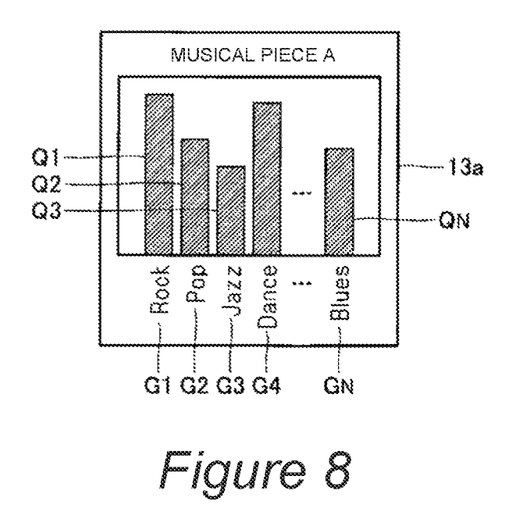
FIG. 8 is a schematic diagram of a first analysis image.
Figure 9:
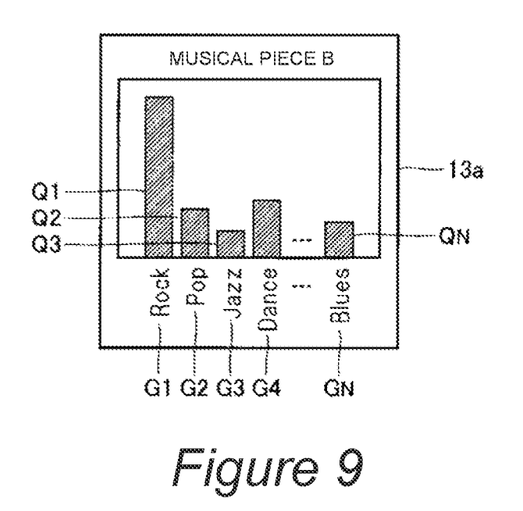
FIG. 9 is a schematic diagram of the first analysis image.

The first analysis image 13*a* is an image representing the feature value F. FIG. 8 is the first analysis image 13*a* of the feature value F calculated for a musical piece A, and FIG. 9 is the first analysis image 13*a* of the feature value F calculated for a musical piece B that has a musical impression that differs from that of the musical piece A. The first analysis image 13*a* is a bar graph in which each of the N degrees of certainty Q1-QN constituting the feature value F is represented on the vertical axis. By referring to the first analysis image 13*a*, the user can visually and intuitively ascertain the degrees of certainty Qn with which the musical piece belongs to each of the N music genres G1-GN. For example, by referring to the first analysis image 13*a* of FIG. 8, the user can confirm that the musical piece A has characteristics of both music genre G1 (rock) and music genre G4 (dance). By referring to the first analysis image 13a of FIG. 9, on the other hand, the user can confirm that the musical piece A has a strong trend typical of the music genre G1 (rock).

Figure 10:
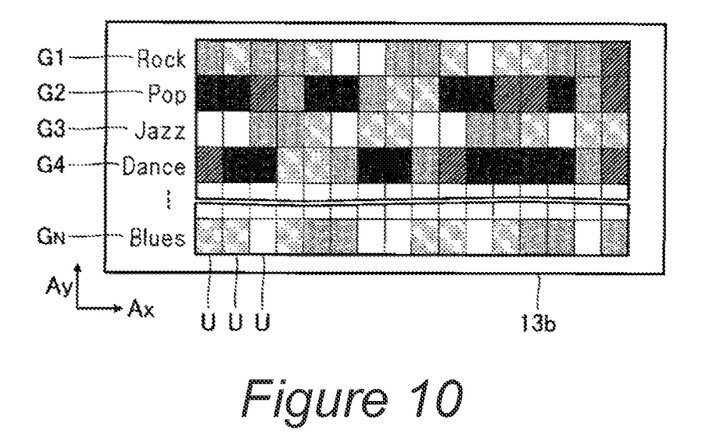
FIG. 10 is a schematic diagram of a second analysis image.

Further, the second analysis image 13b shown in FIG. 10 is an image representing the time series of the unit feature values V over a plurality of unit time intervals T. The second analysis image 13b has mutually orthogonal first axis Ax and second axis Ay. The first axis Ax represents the time axis. N music genres G1-GN are set on the second axis Ay. The second analysis image 13b is an image in which a plurality of unit images U are arranged in a matrix along the first axis Ax and the second axis Ay. Each unit image U corresponds to a combination of one unit time interval T on the first axis Ax and one music genre Gn on the second axis Ay and represents, from among N degrees of certainty q1-qN of the unit feature value V calculated for said unit time interval T, a degree of certainty qn corresponding to a music genre Gn. Specifically, a display mode (for example, gradient or color) of the unit image U corresponding to each degree of certainty qn is set in accordance with the degree of certainty qn. For example, the greater the degree of certainty qn, the higher the gradient of the unit image U.

As can be understood from the foregoing explanation, the arrangement of N unit images U along the second axis Ay of the second analysis image 13b is an arrangement of the unit feature values V (that is, the N degrees of certainty q1-qN) that correspond to any one unit time interval T. In addition, the arrangement of the plurality of unit images U along the first axis Ax of the second analysis image 13b is an arrangement of the temporal changes in the degree of certainty qn that the musical piece belongs to one music genre Gn. By referring to the second analysis image 13b, the user can visually and intuitively ascertain the temporal changes in each degree of certainty qn or the unit feature values V.

(Music Selection Module 24)

Figure 11:
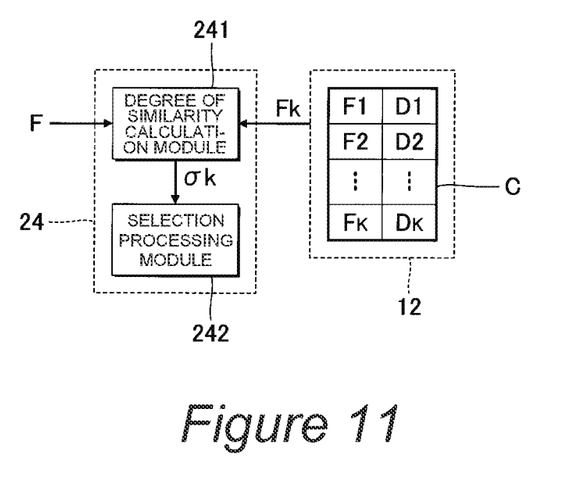
FIG. 11 is a block diagram showing the specific configuration of a music selection module.

The music selection module 24 of FIG. 2 selects, from a plurality (K) candidate musical pieces, a plurality of candidate musical pieces that are musically similar to the target musical piece. FIG. 11 is a block diagram showing the configuration of the music selection module 24.

A candidate table C is stored in the storage device 12. The candidate table C is a data table in which the feature value Fk (k=1–K) and music data Dk are registered for each of K candidate musical pieces. The feature value Fk of each candidate musical piece is a feature value generated in the same manner as for the candidate musical piece by means of the same procedure as that used for the generation of the feature value F of the target musical piece. That is, the feature value Fk is composed of N degrees of certainty Q1-QN that correspond to different music genres. The music data Dk of each candidate musical piece is information relating to the candidate musical piece. For example, various information such as the names of performers and the name of the candidate musical piece is included in the music data Dk.

The music selection module 24 selects, from the K candidate musical pieces, a plurality of candidate musical pieces whose feature values Fk are similar to the feature value F of the target musical piece. The music selection module 24 includes or functions as a degree of similarity calculation module 241 and a selection processing module 242. The degree of similarity calculation module 241 calculates, for each of the K candidate musical pieces, a degree of similarity σk between the feature value Fk of said candidate musical piece and the feature value F of the target musical piece. The degree of similarity σk is an index relating to the degree of similarity between the feature value Fk and the feature value F. Specifically, the degree of similarity σk is the correlation or distance between the feature value Fk and the feature value F. In the following description, a correlation coefficient, which is an index of the correlation between the feature value Fk and the feature value F, is represented as the degree of similarity σk. Accordingly, the greater the similarity between the feature value Fk and the feature value F, the larger the numerical value of the degree of similarity σk.

The selection processing module 242 selects, from K candidate musical pieces, a plurality of candidate musical pieces that have a high degree of similarity σk. Specifically, the selection processing module 242 selects a plurality of candidate musical pieces with a degree of similarity σk that exceeds a prescribed threshold value, or a prescribed number of candidate musical pieces that are located higher in a list ranked in descending order in terms of degree of similarity σk. That is, candidate musical pieces that are similar to the target musical piece in terms of musical impression (particularly the rhythm pattern) are selected.

The display control module 23 presents, to the user, each of a plurality of candidate musical pieces selected by the music selection module 24 (the selection processing module 242). Specifically, the display control module 23 causes the display device 13 to display information (names of the performers and the name of the musical piece) represented by the music data Dk of each candidate musical piece.

Figure 12:
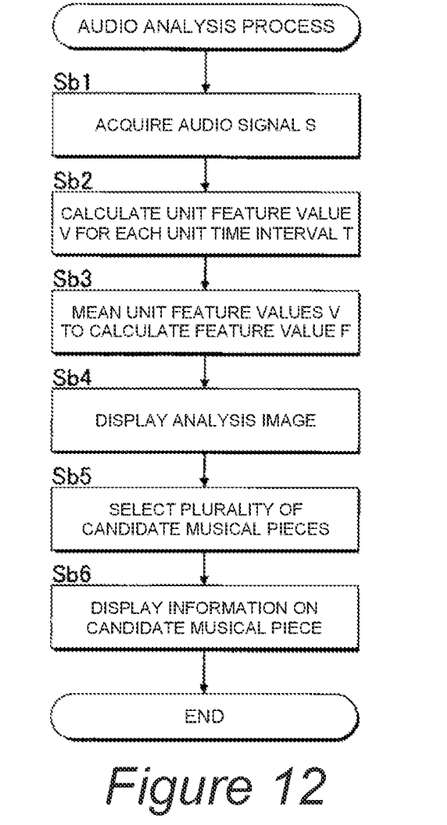
FIG. 12 is a flowchart showing the specific processing steps of an audio analysis process.

FIG. 12 is a flowchart showing the specific processing steps of a process (an audio analysis process) executed by the control device 11. For example, the audio analysis process is initiated by an instruction from the user to the audio analysis device 100.

When the audio analysis process is initiated, the signal acquisition module 21 acquires the audio signal S (Sb1). The signal analysis module 22 calculates the unit feature value V for each of a plurality of unit time intervals T obtained by dividing the audio signal S on the time axis (Sb2). The signal analysis module 22 finds the mean of the unit feature values V for a plurality of unit time intervals T, thereby calculating the feature value F (Sb3). The display control module 23 causes the display device 13 to display the first analysis image 13a and the second analysis image 13b (Sb4). The music selection module 24 selects, from the K candidate musical pieces, a plurality of candidate musical pieces whose feature values Fk are similar to the feature value F of the target musical piece (Sb5). The display control module 23 causes the display device 13 to display information represented by the music data Dk of each of the plurality of candidate musical pieces selected by the music selection module 24 (Sb6).

As described above, in the first embodiment, the feature value F, which includes the degree of certainty Qn that the target musical piece belongs to a music genre Gn for each of the N music genres G1-GN, is calculated. Then, from the K candidate musical pieces, a plurality of candidate musical pieces whose feature values Fk are similar to the feature value F of the target musical piece are selected. Accordingly, compared to the configuration in which candidate musical pieces, which belong to one music genre Gn estimated to be the genre of the target musical piece, are selected, it is possible to select appropriate candidate musical pieces having a musical impression similar to that of the target musical piece, from a comprehensive viewpoint that takes into consideration N music genres G1-GN. For example, if, among the N degrees of certainty Q1-QN of the feature value F of the target musical piece, the degrees of certainty Qn corresponding to rock and jazz are relatively high, among two or more candidate musical pieces belonging to rock, a candidate musical piece which is closer to jazz can be selected.

Particularly in the first embodiment, the variation pattern Y representing the temporal variation for each of a plurality of tones is used in order to calculate the degrees of certainty Qn that the target musical piece belongs to each music genre Gn. Therefore, it is possible to calculate the feature value F, in which the degrees of certainty Qn that the target musical piece belongs to each music genre Gn are appropriately expressed from the standpoint of the rhythm of the target musical piece.

Additionally, in the first embodiment, the mean of the unit feature values V calculated for each of a plurality of unit time intervals T is found, thereby calculating the feature value F. Therefore, the feature value F which reflects the acoustic characteristics of the portion of the target musical piece over a plurality of unit time intervals T can be calculated.

B: Second Embodiment

The second embodiment will be described. In each of the embodiments described below, elements that have the same functions as in the first embodiment have been assigned the same reference symbols as those used to describe the first embodiment and their detailed descriptions have been appropriately omitted.

Figure 13:
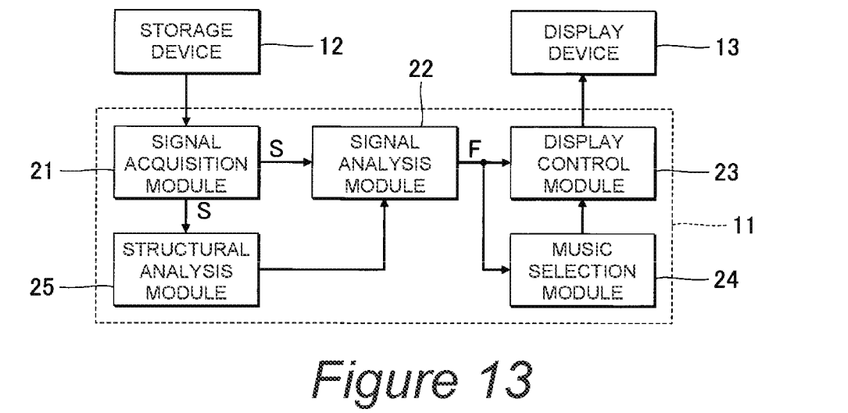
FIG. 13 is a block diagram showing the functional configuration of an audio analysis device according to a second embodiment.

FIG. 13 is a block diagram showing the functional configuration of an audio analysis device 100 according to a second embodiment. The audio analysis device 100 according to the second embodiment is a configuration in which a structural analysis module 25 has been added to the same elements as those of the first embodiment (the signal acquisition module 21, the signal analysis module 22, the display control module 23, and the music selection module 24).

The structural analysis module 25 analyzes the audio signal S in order to identify a plurality of musical piece structural segments of the target musical piece. Musical piece structural segments are segments into which a target musical piece is divided on a time axis in accordance with their musical significance or position within the musical piece. Examples of musical piece structural segments include an intro, an A-segment (verse), a B-segment (bridge), a chorus, and an outro. Any known music analysis technique is employed for the identification of the musical piece structural segments carried out by the structural analysis module 25.

The signal analysis module 22 (the third processing module 223) of the second embodiment uses weighted values set for each musical piece structural segment to calculate the weighted means of the unit feature values V over a plurality of unit time intervals T, thereby calculating the feature value F. That is, the signal analysis module 22 individually sets a weighted value with respect to each unit feature value V for each musical piece structural segment. For example, the weighted value in each unit time interval T in the musical piece structural segment corresponding to the A-segment, the B-segment, or the chorus, exceeds the weighted value in each unit time interval T in the musical piece structural segment corresponding to the intro or the outro. In addition, the weighted value in each unit time interval T in the musical piece structural segment corresponding to the chorus exceeds the weighted value in each unit time interval in the musical piece structural segment corresponding to the A-segment or the B-segment.

Figure 14:
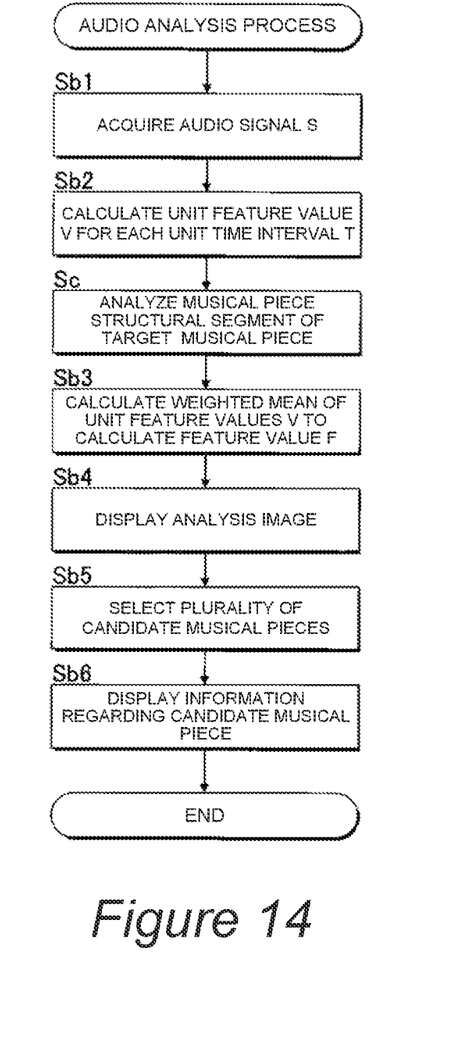
FIG. 14 is a flowchart showing the specific processing steps of the audio analysis process according to the second embodiment.

FIG. 14 is a flowchart showing the specific processing steps of the audio analysis process according to the second embodiment. When the acquisition of the audio signal S (Sb1) and the calculation of the unit feature value V for each unit time interval T (Sb2) are executed, the structural analysis module 25 analyzes the audio signal S in order to identify a plurality of musical piece structural segments of the target musical piece (Sc). The signal analysis module 22 calculates the weighted mean of the unit feature values V to which the weighted values set for each musical piece structural segment are applied, thereby calculating the feature value F (Sb3). The operations of the display control module 23 and the music selection module 24 (Sb4-Sb6) are the same as those in the first embodiment. The order of the calculation of the unit feature value V (Sb2) and the analysis of the musical piece structural segments (Sc) can be reversed.

The same effect as the first embodiment is realized in the second embodiment. The musical impression of a musical piece can change for each musical piece structural segment. In the second embodiment, since the weighted value of each unit feature value V is set for each musical piece structural segment, it is possible to calculate a feature value F that appropriately reflects the trend in changing musical impressions for each musical piece structural segment.

C: Modified Examples

Specific modified embodiments to be added to each of the aforementioned embodiment examples are described below. Two or more embodiments arbitrarily selected from the following examples can be appropriately combined as long as they are not mutually contradictory.

(1) In the embodiments described above, the mean of the unit feature values V over a plurality of unit time intervals T is found in order to calculate the feature value F, but the unit feature value V for each unit time interval T can be calculated as the final feature value F. That is, the signal analysis module 22 calculates the feature value F for each of a plurality of unit time intervals T. In a configuration in which the feature value F is calculated for each unit time interval T, the third processing module 223 is omitted.

(2) In the embodiments described above, the mean of the unit feature values V over all unit time intervals T of the target musical piece is found, but the feature value F can be calculated for a prescribed segment in the target musical piece. For example, the mean of the unit feature values V for two or more unit time intervals T in a specific musical piece structural segment of the target musical piece, such as the chorus, can be found, thereby calculating the feature value F.

(3) In the embodiments described above, the correlation between the variation pattern Zn and the variation pattern Y is represented as the degree of certainty qn of the unit feature value V, but the second processing module 222 can calculate the distance between the variation pattern Zn and the variation pattern Y as the degree of certainty qn. In the configurations described above, the higher the correlation between the variation pattern Zn and the variation pattern Y, the smaller the numerical value of the degree of certainty qn.

(4) In the embodiments described above, the music selection module 24 selects a plurality of candidate musical pieces whose feature values Fk are similar to the feature value F of the target musical piece, but the music selection module 24 can select one candidate musical piece. Specifically, the music selection module 24 selects one candidate musical piece for which the degree of similarity αk is maximum.

(5) In the embodiments described above, the correlation between the feature value Fk of the candidate musical piece and the feature value F of the target musical piece is calculated as the degree of similarity σk, but the degree of similarity calculation module 241 can calculate the distance between the feature value Fk and the feature value F as the degree of similarity σk. In the configuration described above, the greater the similarity between the feature value Fk and the feature value F, the smaller the numerical value of the degree of similarity σk. Accordingly, the selection processing module 242 selects a plurality of candidate musical pieces whose degree of similarity σk falls below a prescribed threshold value, or a prescribed number of candidate musical pieces that are located higher in a list ranked in ascending order in terms of the degree of similarity σk.

(6) In the embodiments described above, information represented by the music data Dk of each candidate musical piece is displayed on the display device 13, but the process executed with respect to the candidate musical pieces selected by the music selection module 24 is not limited to the example described above. For example, in a configuration in which the music data Dk includes a music file representing the performance sounds of the candidate musical piece, the music file can be used to reproduce the performance sounds of the musical piece. In addition, if the music file of the candidate musical piece is not stored in the storage device 12, a music file of the candidate musical piece can be acquired from a music distribution device.

(7) In the embodiments described above, candidate musical pieces whose feature values Fk are similar to the feature value F of the target musical piece are selected, but the method for using the feature value F is not limited to the example described above. For example, the feature value F can be registered as additional music information relating to the audio signal S of the target musical piece. The feature value F included in the additional information is used to search for musical pieces belonging to a specific music genre Gn. As can be understood from the foregoing explanation, the feature value F is useful music information pertaining to a musical piece, and the usage of the feature value F is not limited to the selection of candidate musical pieces. Therefore, the music selection module 24 described in the above-mentioned embodiments can be omitted.

(8) The music genre Gn in the embodiments described above is one example of a "music category." A music category is a musical classification of a musical piece. In addition to the music genre Gn described in the embodiments described above, music categories include classifications according to musical impressions such as "cheerful music," "depressing music," and the like.

(9) The music analysis device 100 can also be realized by means of a server device that communicates with a terminal device such as a mobile phone or a smartphone. For example, the audio analysis device 100 analyzes the audio signal S received from a terminal device, thereby calculating the feature value F, and notifies the requesting terminal device of the candidate musical pieces selected using said feature value F. A configuration in which the feature value F calculated from the audio signal S is transmitted to the terminal device, or a configuration in which the music data Dk of the candidate musical pieces are transmitted to the terminal device can also be assumed.

(10) As described above, the functions of the audio analysis device 100 described as examples above are realized by means of the cooperation between one or more processors that constitute the control device 11, and a program stored in the storage device 12. The program according to the present disclosure can be provided in the form of a program stored in a computer-readable storage medium installed in a computer. The storage medium is, for example, a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media. In addition, in a configuration in which a distribution device distributes the program via a communication network, a storage device 12 that stores the program in the distribution device corresponds to the non-transitory storage medium.

D: Additional Statement

From the foregoing embodiments, the following configurations, for example, can be understood.

An audio analysis method according to one aspect (aspect 1) of the present disclosure comprises acquiring an audio signal representing performance sounds of a musical piece; calculating, for each of a plurality of music categories, a feature value that includes the degree of certainty that the musical piece belongs to the music category, by analyzing the audio signal; and selecting one or more candidate musical pieces from among a plurality of candidate musical pieces in which the feature value is similar to the feature value calculated for the musical piece. In the aspect described above, a feature value that includes the degree of certainty that the musical piece belongs to the music category is calculated for each of a plurality of music categories. Then, of the plurality of candidate musical pieces, one or more candidate musical pieces whose feature value is similar to that of the musical piece are selected. Accordingly compared to the configuration in which candidate musical pieces, which belong to one music category estimated to be the music category of the target musical piece are selected, it is possible to select appropriate candidate musical pieces whose musical impressions are similar to that of the musical piece, from a comprehensive viewpoint that takes into consideration a plurality of music categories. In a specific example (aspect 2) of aspect 1, the plurality of music categories are a plurality of music genres.

A "music category" is a musical classification of a musical piece. A typical example of a "music category" is a music genre (for example, rock, jazz, or the like), but classifications according to musical impressions such as "cheerful music," "depressing music," and the like are also included in the concept of "music category."

In a specific example of aspect 1 or 2 (aspect 3), when the one or more candidate musical pieces are selected, for each of the plurality of candidate musical pieces, the degree of similarity between the feature value of the candidate musical piece and the calculated feature value is calculated, and the one or more candidate musical pieces from among the plurality of candidate musical pieces in which the degrees of similarity are high are selected. In the aspect described above, one or more candidate musical pieces can be appropriately selected in accordance with the feature values of the candidate musical pieces and the feature value of the musical piece.

The "degree of similarity" is an index of the similarity between feature values, for example, and is, specifically, a distance or a correlation. The concept of "high degree of similarity" includes both "short distance" and "high correlation." Accordingly, "the degree of similarity exceeds a threshold value" means both that "the distance falls below a threshold value" and that "the correlation exceeds the threshold value." "One or more candidate musical pieces in which the degrees of similarity are high" means, for example, one or more candidate musical pieces in which the degrees of similarity exceeds a threshold value, or one or more candidate musical pieces that are located higher in a list ranked in descending order in terms of the degree of similarity.

In a specific example of any one of aspects 1 to 3 (aspect 4), when the feature value is calculated, a variation pattern representing the temporal variation of each of a plurality of tones is generated by analyzing the audio signal, and, for each of a plurality of music categories, the variation pattern of the music category is compared with the generated variation pattern; thus, the degree of certainty that the musical piece belongs to the music category is calculated. In the aspect described above, the variation pattern representing the temporal variation for each of a plurality of tones is used in order to calculate the degrees of certainty that the musical piece represented by the audio signal belongs to each music category. Thus, it is possible to calculate feature values that appropriately express degrees of certainty that a musical piece belongs to each music category are from the standpoint of the rhythm of the musical piece.

In a specific example of any one of aspects 1 to 4 (aspect 5), when the feature value is calculated, the feature value is calculated for each of a plurality of unit time intervals obtained by dividing the audio signal on a time axis. In the aspect described above, because the feature value is calculated for each of the plurality of unit time intervals, it is possible to evaluate the temporal transition of the feature value in the musical piece.

In a specific example of any one of aspects 1 to 4 (aspect 6), when the feature value is calculated, a unit feature value that includes the degree of certainty that the musical piece belongs to each of the plurality of music categories is calculated for each of a plurality of unit time intervals obtained by dividing the audio signal on a time axis, and, of the plurality of unit time intervals, the mean of the unit feature values for two or more unit time intervals is found, thereby calculating the feature value. In the aspect described above, because the mean of the unit feature values calculated for two or more unit time intervals is found, thereby calculating the feature value, a feature value which reflects the acoustic characteristics of the portion of the musical piece over two or more unit time intervals can be calculated.

The audio signal analysis method according to a specific example (aspect 7) of aspect 6 further comprises specifying a plurality of musical piece structural segments of the musical piece by analyzing the audio signal, wherein, when the mean of the unit feature value is found, a weighted value set for each of the plurality of musical piece structural segments is used to calculate the weighted mean of the unit feature values for the two or more unit time intervals. In the aspect described above, the weighted value set for each musical piece structural segment is used to calculate the weighted mean of a plurality of unit feature values. Therefore, it is possible to calculate a feature value that appropriately reflects the tendency for the musical impression to change for each musical piece structural segment.

"Musical piece structural segments" are segments that are obtained by dividing a musical piece on a time axis in accordance with their musical significance or location within the musical piece. Examples of musical piece structural segments include an intro, an A-segment (verse), a B-segment (bridge), a chorus, and an outro.

An audio analysis device according to one aspect (aspect 8) of the present disclosure comprises a signal acquisition module for acquiring an audio signal representing performance sounds of a musical piece; a signal analysis module for calculating, for each of a plurality of music categories, a feature value that includes the degree of certainty that the musical piece belongs to the music category, by analyzing the audio signal; and a music selection module for selecting one or more candidate musical pieces from among a plurality of candidate musical pieces in which the feature value is similar to the feature value calculated for the musical piece.

A program according to one aspect (aspect 9) of the present disclosure causes a computer to function as a signal acquisition module for acquiring an audio signal representing performance sounds of a musical piece; as a signal analysis module for calculating, for each of a plurality of music categories, a feature value that includes the degree of certainty that the musical piece belongs to the music category, by analyzing the audio signal; and as a music selection module for selecting one or more candidate musical pieces from among a plurality of candidate musical pieces in which the feature value is similar to the feature value calculated for the musical piece.

What is claimed is:

1. An audio analysis method realized by a computer, the audio analysis method comprising:
    acquiring an audio signal representing performance sounds of a musical piece;
    calculating a calculated feature value by analyzing the audio signal, the calculated feature value including a degree of certainty for each of a plurality of music categories indicating the degree of certainty that the musical piece belongs to the music category; and
    selecting, from among a plurality of candidate musical pieces, one or more candidate musical pieces whose feature value is similar to the calculated feature value based on the degree of certainty of the calculated feature value,
    the calculating of the calculated feature value including
       calculating a unit feature value that includes the degree of certainty that the musical piece belongs to each of the plurality of music categories for each of a plurality of unit time intervals obtained by dividing the audio signal on a time axis, and
       calculating the calculated feature value by finding a mean of unit feature values for two or more unit time intervals of the plurality of unit time intervals.

2. The audio analysis method according to claim 1, wherein
    the plurality of music categories are a plurality of music genres.

3. The audio analysis method according to claim 1, wherein
    the selecting of the one or more candidate musical pieces includes
       calculating, for each of the plurality of candidate musical pieces, a degree of similarity between the feature value of the candidate musical piece and the calculated feature value, and
       selecting the one or more candidate musical pieces with a degree of similarity that exceeds a threshold from among the plurality of candidate musical pieces.

4. The audio analysis method according to claim 1, wherein
    the calculating of the calculated feature value includes generating a variation pattern representing a temporal variation of each of a plurality of tones for each of the plurality of unit time intervals, by analyzing the audio signal, and comparing, for each of the plurality of music categories, a variation pattern of the music category with the generated variation pattern to calculate the degree of certainty that the musical piece belongs to the music category, to calculate the unit feature value.

5. The audio analysis method according to claim 1, further comprising specifying a plurality of musical piece structural segments of the musical piece by analyzing the audio signal, the finding of the mean of the unit feature values including calculating a weighted mean of the unit feature values for the two or more unit time intervals by using a weighted value set for each of the plurality of musical piece structural segments.

6. An audio analysis device comprising:

an electronic controller including at least one processor, the electronic controller being configured to execute a plurality of modules including a signal acquisition module configured to acquire an audio signal representing performance sounds of a musical piece, a signal analysis module configured to calculate a calculated feature value by analyzing the audio signal, the calculated feature value including a degree of certainty for each of a plurality of music categories indicating the degree of certainty that the musical piece belongs to the music category, and a music selection module configured to select, from among a plurality of candidate musical pieces, one or more candidate musical pieces whose feature value is similar to the calculated feature value based on the degree of certainty of the calculated feature value, the signal analysis module being configured to calculate a unit feature value that includes the degree of certainty that the musical piece belongs to each of the plurality of music categories for each of a plurality of unit time intervals obtained by dividing the audio signal on a time axis, and calculate the calculated feature value by finding a mean of unit feature values for two or more unit time intervals of the plurality of unit time intervals.

7. The audio analysis device according to claim 6, wherein the plurality of music categories are a plurality of music genres.

8. The audio analysis device according to claim 6, wherein the music selection module includes a degree of similarity calculation module configured to calculate, for each of the plurality of candidate musical pieces, a degree of similarity between the feature value of the candidate musical piece and the calculated feature value, and a selection processing module configured to select the one or more candidate musical pieces with a degree of similarity that exceeds a threshold from among the plurality of candidate musical pieces.

9. The audio analysis device according to claim 6, wherein the signal analysis module is configured to generate a variation pattern representing a temporal variation of each of a plurality of tones for each of the plurality of unit time intervals, by analyzing the audio signal, and compare, for each of the plurality of music categories, a variation pattern of the music category with the generated variation pattern to calculate the degree of certainty that the musical piece belongs to the music category, to calculate the unit feature value.

10. The audio analysis device according to claim 6, wherein the electronic controller is configured to further execute a structural analysis module that is configured to specify a plurality of musical piece structural segments of the musical piece by analyzing the audio signal, and the signal analysis module is configured to calculate a weighted mean of the unit feature values for the two or more unit time intervals by using a weighted value set for each of the plurality of musical piece structural segments.

11. A non-transitory computer-readable medium storing a program that causes a computer to function as:

a signal acquisition module configured to acquire an audio signal representing performance sounds of a musical piece;

a signal analysis module configured to calculate a calculated feature value by analyzing the audio signal, the calculated feature value including a degree of certainty for each of a plurality of music categories indicating the degree of certainty that the musical piece belongs to the music category; and a music selection module configured to select, from among a plurality of candidate musical pieces, one or more candidate musical pieces whose feature value is similar to the calculated feature value based on the degree of certainty of the calculated feature value, the signal analysis module being configured to calculate a unit feature value that includes the degree of certainty that the musical piece belongs to each of the plurality of music categories for each of a plurality of unit time intervals obtained by dividing the audio signal on a time axis, and calculate the calculated feature value by finding a mean of unit feature values for two or more unit time intervals of the plurality of unit time intervals.

* * * * *